US012514300B2

(12) United States Patent
Campitelli et al.

(10) Patent No.: US 12,514,300 B2
(45) Date of Patent: Jan. 6, 2026

(54) INHALER ARTICLE

(71) Applicant: PHILIP MORRIS PRODUCTS S.A., Neuchatel (CH)

(72) Inventors: Gennaro Campitelli, Neuchatel (CH); Onur Dayioglu, Neuchatel (CH); Leonardo Nappi, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 415 days.

(21) Appl. No.: 18/017,605

(22) PCT Filed: Jul. 26, 2021

(86) PCT No.: PCT/EP2021/070881
§ 371 (c)(1),
(2) Date: Jan. 23, 2023

(87) PCT Pub. No.: WO2022/018301
PCT Pub. Date: Jan. 27, 2022

(65) Prior Publication Data
US 2023/0263238 A1    Aug. 24, 2023

(30) Foreign Application Priority Data

Jul. 24, 2020    (EP) .................................... 20187738

(51) Int. Cl.
*A24F 42/60*    (2020.01)
*A24D 3/17*    (2020.01)
(Continued)

(52) U.S. Cl.
CPC ................ *A24F 42/60* (2020.01); *A24D 3/17* (2020.01); *A24F 42/20* (2020.01); *A61M 15/06* (2013.01); *A61M 2202/064* (2013.01)

(58) Field of Classification Search
CPC .......... A24D 3/17; A24F 42/20; A24F 42/60; A61M 15/06
See application file for complete search history.

(56) References Cited

U.S. PATENT DOCUMENTS

| 2008/0302373 | A1* | 12/2008 | Stokes ................ A24D 3/0216 131/84.1 |
| 2017/0135397 | A1* | 5/2017 | Buehler ............ A61M 15/0036 |
| 2020/0113227 | A1* | 4/2020 | Mclaughlin .......... A24D 3/0225 |

FOREIGN PATENT DOCUMENTS

| EP | 3669916 | 6/2020 |
| WO | WO 2015/166344 | 11/2015 |

(Continued)

OTHER PUBLICATIONS

Extended European Search Report for Application No. 20187738.8 dated Jan. 26, 2021 (10 pages).

(Continued)

*Primary Examiner* — Eric Yaary
(74) *Attorney, Agent, or Firm* — Mueting Raasch Group

(57) ABSTRACT

There is provided an inhaler article (10) having an upstream end (1) and a downstream end (2). The inhaler article comprises an upstream section (3) which comprises an end plug (5). The inhaler article comprises a downstream section (4) located downstream of the upstream section and spaced apart from the upstream section. The downstream section comprises a filter segment (6). The resistance to draw per unit length of the filter segment is greater than 0 millimetres of water per millimetre and less than about 3 millimetres of water per millimetre. The inhaler article comprises a cavity (7) defined between the upstream and downstream sections, and configured to be in fluid communication with the exterior of the article. The inhaler article comprises a capsule (9) containing an inhalable material, and located in (Continued)

the cavity. There is also provided an inhaler system (100) comprising such an inhaler article and a holder (120).

14 Claims, 4 Drawing Sheets

(51) Int. Cl.
*A24F 42/20* (2020.01)
*A61M 15/06* (2006.01)

(56) References Cited

FOREIGN PATENT DOCUMENTS

| WO | WO 2017/109626 | 6/2017 |
|----|----------------|--------|
| WO | WO 2017/109678 | 6/2017 |
| WO | WO 2018/007886 | 1/2018 |
| WO | WO 2018/007887 | 1/2018 |
| WO | WO 2018/100461 | 6/2018 |
| WO | WO 2018/100462 | 6/2018 |
| WO | WO 2019/003118 | 1/2019 |
| WO | WO 2019/082057 | 5/2019 |
| WO | WO 2019/130158 | 7/2019 |
| WO | WO 2019/186337 | 10/2019 |
| WO | WO 2019/186372 | 10/2019 |
| WO | WO 2019/186395 | 10/2019 |
| WO | WO 2020/178714 | 9/2020 |
| WO | WO 2020/178715 | 9/2020 |
| WO | WO 2021/059094 | 4/2021 |
| WO | WO 2021/079341 | 4/2021 |
| WO | WO 2021/079343 | 4/2021 |
| WO | WO 2021/079345 | 4/2021 |
| WO | WO 2021/090143 | 5/2021 |

OTHER PUBLICATIONS

PCT International Search Report and Written Opinion for PCT/EP2021/070881 dated Sep. 30, 2021 (13 pages).

* cited by examiner

INHALER ARTICLE

This application is a U.S. National Stage Application of International Application No. PCT/EP2021/070881 filed Jul. 26, 2021, which was published in English on Jan. 27, 2022, as International Publication No. WO 2022/018301 A1. International Application No. PCT/EP2021/070881 claims priority to European Application No. 20187738.8 filed Jul. 24, 2020.

The present disclosure relates to an inhaler article having a particular filter segment. The present disclosure also relates to an inhaler system comprising a holder for receiving the inhaler article and said inhaler article.

Inhaler articles, such as dry powder inhalers, are not always fully suitable to provide dry powder particles to the lungs at inhalation or air flow rates that are within conventional smoking regime inhalation or air flow rates. Dry powder inhalers may be complex to operate or may involve moving parts. Dry powder inhalers often strive to provide a suitable dry powder dose or capsule load in a single draw.

Some dry powder inhalers have a component for storing the dry powder, such as a capsule. The capsule may be located within the inhaler and can be activated by being pierced by a separate piercing element. Once the capsule has been activated, a consumer may draw on the mouth end (downstream end or proximal end) of the inhaler to generate an air flow through the inhaler so that the capsule rotates about itself. The agitation of the capsule within the inhaler article and the air flow pressure causes the release of dry powder from the pierced capsule. The released dry powder is carried by the air flow to the mouth of a user.

Some inhaler articles comprise a retaining segment located downstream of the capsule. The retaining, or support, segment is mainly provided to retain the capsule within the inhaler. The retaining segment may be hollow or porous to allow the dry powder to pass through. However, some retaining or support segments that are hollow or relatively highly porous may allow a relatively large amount of dry powder to pass through. This may mean that when a consumer draws on the article the doses are too large and, as a result, the capsule may deplete prematurely, which may be detrimental to a consumer's experience. Alternatively, the retaining element or segment may have a relatively low porosity and the consumer may not be able to adequately deplete the capsule given that the resistance to draw of the inhaler article is relatively high and the doses drawn by the consumer are relatively small.

Furthermore, the upstream end (distal end) of the retaining segment of capsule-containing inhaler articles sustain considerable axial force during the activation process of the capsule. During such activation process, a piercing element extends into upstream end of the inhaler article in order to contact and pierce the capsule located within the article. Upon first contact, the piercing element pushes the capsule against the upstream end of the retaining (or support) segment in order to successfully pierce the capsule. Therefore, the downstream components of the inhaler article, especially the retainer segment, should be relatively resistant to deformation, particularly under compression, and particularly in the longitudinal direction, while also being sufficiently porous or having suitably sized longitudinal air flow channels so that the resistance to draw (RTD) of the inhaler article ensures a pleasant experience for a consumer.

It would be desirable to provide an inhaler article that is cost-effective and fast to manufacture and that performs effectively by ensuring reliable capsule depletion during use in order to provide a satisfactory experience for inhaler or aerosol-generating article consumers.

According to an aspect of the present disclosure, there is provided an inhaler article having an upstream end and a downstream or mouth end. The inhaler article comprises an upstream section. The upstream section comprises an end plug. The inhaler article comprises a downstream section located downstream of the upstream section and spaced apart from the upstream section. The downstream section comprises a filter segment (also referred to as a support segment or mouthpiece segment). The resistance to draw per unit length of the filter segment is greater than 0 millimetres of water (also expressed as millimetres water, mm $H_2O$, mm water, mm water gauge, mmWG or mm of water) per millimetre (mm) and less than about 3 millimetres of water per millimetre. This may be similar or equivalent to the resistance to draw of a conventional cigarette or a conventional dry powder inhaler. The inhaler article comprises a cavity defined between the upstream section and the downstream section. The cavity is configured to be in fluid communication with the exterior of the inhaler article. The inhaler article comprises a capsule containing an inhalable material. The capsule is located in the cavity.

According to an aspect of the present disclosure, there is provided an inhaler article having an upstream end and a downstream end. The inhaler article may comprise an upstream section. The upstream section may comprise an end plug. The inhaler article may comprise a downstream section located downstream of the upstream section and spaced apart from the upstream section. The downstream section may comprise a mouthpiece segment or a filter segment. The resistance to draw per unit length of the mouthpiece segment or the filter segment may be greater than 0 mm of water per mm and less than about 3 mm of water per mm. The inhaler article may comprise a cavity defined between the upstream section and the downstream section. The cavity may be configured to contain a capsule containing an inhalable material. The cavity may be configured to be in fluid communication with the exterior of the inhaler article.

The inhaler article may comprise a capsule containing an inhalable material. The capsule may be located in the cavity.

According to an aspect of the present disclosure, there is also provided a mouthpiece segment or a filter segment for use in an inhaler article, or any other aerosol-generating article. The resistance to draw per unit length of the mouthpiece segment or the filter segment may be greater than 0 mm of water per mm and less than about 3 mm of water per mm.

Providing a filter segment downstream of the capsule having a resistance to draw (RTD) per unit length between about 0 mm of water per mm and about 3 mm of water per mm has been found to be advantageous in ensuring a suitable air flow can be generated by a user due to the RTD characteristics of the filter segment. This provides a suitable air flow rate in order to achieve effective depletion of the inhalable material contained within the capsule.

The "filter segment" of the inhaler article may alternatively be referred to in the present disclosure as a "support segment", a "mouthpiece segment", a "retainer segment", a "downstream segment" or "downstream section" of the inhaler article. The cavity is preferably defined between the upstream section and the filter segment, more preferably between the end plug and the filter segment.

The terms "upstream" and "downstream" refer to relative positions of elements of the holder, inhaler article and inhaler systems described in relation to the direction of inhalation air flow as it is drawn through the inhaler article, holder and inhaler systems. "Downstream" is the mouth end. "Upstream" is distal to the mouth end.

The term "longitudinal" refers to the direction corresponding to the main longitudinal axis of the inhaler article or inhaler system, extending between the upstream and downstream ends. During use, air is drawn through the aerosol-generating article or inhaler article in the longitudinal direction from the upstream end to the downstream end. The term "transverse" refers to the direction that is perpendicular to the longitudinal axis. Any reference to the "cross-section" of the inhaler article or a component thereof refers to the transverse cross-section unless stated otherwise. The term "length" denotes the dimension of a component of the aerosol-generating article or inhaler article in the longitudinal direction. For example, it may be used to denote the dimension of the capsule or filter segment in the longitudinal direction. The term "tangential" refers to a direction that is at an angle from the referenced direction. For example, a tangential angle is not parallel with the referenced direction.

The terms "proximal" and "distal" are used to describe the relative positions of components, or portions of components, of the inhaler article, holder or inhaler system. Holders or elements (such as a sleeve) forming the holder, according to the disclosure have a proximal end which, in use, receives an inhaler article and an opposing distal end which may be a closed end, or have an end closer to the proximal end of the holder. Inhaler articles, according to the disclosure have a proximal end. In use, the nicotine particles exit the proximal end of the inhaler article for delivery to a user. The inhaler has a distal end opposing the proximal end. The proximal end of the inhaler article may also be referred to as the mouth end or downstream end. A distal end of a component may correspond to the upstream end of such a component. A proximal end of a component may correspond to the downstream end of such a component.

Unless otherwise specified, the resistance to draw (RTD) of a component or the inhaler article is measured in accordance with ISO 6565-2015. The RTD refers the pressure required to force air through the full length of a component. The terms "pressure drop" or "draw resistance" of a component or article may also refer to the "resistance to draw". Such terms generally refer to the measurements in accordance with ISO 6565-2015 are normally carried out at under test at a volumetric flow rate of about 17.5 millilitres per second at the output or downstream end of the measured component at a temperature of about 22 degrees Celsius, a pressure of about 101 kPa (about 760 Torr) and a relative humidity of about 60%.

The resistance to draw per unit length of a particular component, such as the filter segment, can be calculated by dividing the measured resistance to draw of the component by the total axial length of the component. The RTD per unit length refers the pressure required to force air through a unit length of a component. Throughout the present disclosure, a unit length refers to a length of 1 mm. Accordingly, in order to derive the RTD per unit length of a particular filter segment, a specimen of a particular length, 15 mm for example, of the filter segment can be used in measurement. The RTD of such a specimen is measured in accordance with ISO 6565-2015. If, for example, the measured RTD is about 15 mm of water, then the RTD per unit length of the filter segment is about 1 mm of water per mm. The RTD per unit length of the filter segment is dependent on the structural properties of the material used for the filter segment as well as the cross-sectional geometry or profile of the filter segment, amongst other factors.

The relative RTD, or RTD per unit length, of the filter segment may be between about 0 mm of water per mm and about 3 mm of water per mm. Alternatively, the RTD per unit length of the filter segment may be between about 0 mm of water per mm and about 2.5 mm of water per mm. Alternatively, the RTD per unit length of the filter segment may be between about 0 mm of water per mm and about 2 mm of water per mm. The RTD per unit length of the filter segment may be between about 0 mm of water per mm and about 1 mm of water per mm. The RTD per unit length of the filter segment may be between about 0 mm of water per mm and about 0.75 mm of water per mm.

As mentioned above, the relative RTD, or RTD per unit length, of the filter segment may be greater than about 0 mm of water per mm and less than about 3 mm of water per mm. Alternatively, the RTD per unit length of the filter segment may be greater than about 0 mm of water per mm and less than about 2.5 mm of water per mm. Alternatively, the RTD per unit length of the filter segment may be greater than about 0 mm of water per mm and less than about 2 mm of water per mm. The RTD per unit length of the filter segment may be greater than about 0 mm of water per mm and less than about 1 mm of water per mm. The RTD per unit length of the filter segment may be greater than about 0 mm of water per mm and less than about 0.75 mm of water per mm.

The RTD per unit length of the filter segment may be greater or equal to 0.01 mm of water per mm. Thus, the RTD per unit length of the filter segment may be between about 0.01 mm of water per mm and about 3 mm of water per mm. Alternatively, the RTD per unit length of the filter segment may be between about 0.01 mm of water per mm and about 2.5 mm of water per mm. Alternatively, the RTD per unit length of the filter segment may be between about 0.01 mm of water per mm and about 2 mm of water per mm. The RTD per unit length of the filter segment may be between about 0.01 mm of water per mm and about 1 mm of water per mm. The RTD per unit length of the filter segment may be between about 0.01 mm of water per mm and about 0.75 mm of water per mm.

The resistance to draw of the filter segment may be greater than 0 millimetres of water and less than about 20 millimetres of water. The resistance to draw of the filter segment may be greater than 0 mm of water and less than about 15 mm of water. The resistance to draw of the filter segment may be greater than 0 mm of water and less than about 10 mm of water. The resistance to draw of the filter segment may be greater than 0 mm of water and less than about 10 mm of water.

The filter segment may be configured to sustain a force of up to about 15 Newtons being applied to its upstream end without deforming substantially in the longitudinal direction. As discussed above, the filter segment located downstream of the capsule should be configured to sustain the compressive force exerted by the capsule on the upstream end of the filter segment during activation of the capsule. Thus, the filter segment may be rigid enough to sustain such activation of the capsule. The filter segment may comprise a rigid material.

The filter segment may be configured to sustain a force of up to about 12 Newtons being applied to the upstream end of the filter segment without deforming substantially in the longitudinal direction. The filter segment may be configured to sustain a force of up to about 7 Newtons being applied to its upstream end without deforming substantially. The filter segment may be configured to sustain a force of at least about 3 Newtons being applied to its upstream end without deforming substantially. The filter segment may be configured to sustain a force of at least between about 3 Newtons and about 15 Newtons being applied to its upstream end without deforming substantially. The filter segment may be configured to sustain a force of at least about least between about 3 Newtons and about 12 Newtons being applied to its upstream end without deforming substantially. It has been found that ensuring that the filter segment is capable of sustain any of such range of forces being applied to its upstream end ensures that the filter segment is not damaged during the activation process of the capsule, thereby not negatively impacting the performance of the inhaler article and a consumer's experience.

The expression "without deforming substantially" is used herein to refer to the filter segment not deforming plastically, irreversibly or permanently. It is advantageous that the filter segment is rigid and strong enough to sustain a force of up to about 15 Newtons being applied to its upstream end without deforming plastically, irreversibly or permanently in the longitudinal direction. Any permanent deformation remaining in the filter segment after piercing of the capsule could be detrimental to the overall performance and structural integrity of the inhaler article.

The filter segment may be formed of a fibrous material. The filter segment may be formed of a porous material. The filter segment may be formed of a biodegradable material. The filter segment may be formed of a cellulose material, such as cellulose acetate. The filter segment may be formed of a polylactic acid based material. The filter segment may be formed of a bioplastic material, preferably a starch-based bioplastic material. The filter segment may be made by injection moulding or by extrusion. Bioplastic-based materials are advantageous because they are able to provide filter segment structures that are simple and cheap to manufacture with a particular and complex cross-sectional profile, which may comprise a plurality of relatively large air flow channels extending through the filter segment material, that provides suitable RTD characteristics to ensure adequate capsule depletion while also being strong enough to sustain the forces endured by the filter segment during activation of the capsule.

The filter segment may be formed from a sheet of suitable material that has been crimped, pleated, gathered, woven or folded into an element that defines a plurality of longitudinally extending channels. Such sheet of suitable material may be formed of paper, cardboard, a polymer, such as polylactic acid, or any other cellulose-based, paper-based material or bioplastic-based material. A cross-sectional profile of such a filter segment may show the channels as being randomly oriented.

The filter segment may be formed in any other suitable manner. For example, the filter segment may be formed from a bundle of longitudinally extending tubes. The longitudinally extending tubes may be formed from polylactic acid. The filter segment may be formed by extrusion, moulding, lamination, injection, or shredding of a suitable material. Thus, it is preferred that there is a low-pressure drop (or RTD), yet non-zero, from an upstream end of the filter segment to a downstream end of the filter segment.

The filter segment may comprise at least one filter (air flow) channel extending along the filter segment. Preferably, the at least one filter air flow channel extend along the whole length of the filter segment. The at least one filter channel may have a substantially circular cross-section. The at least one filter channel may have a substantially Y-shaped or T-shaped cross-section. The filter segment may comprises a plurality of such filter air flow channels extending along the filter segment. The filter segment may comprise at least three filter air flow channels. The provision of at least one filter air flow channel in the filter segment allows the filter segment to meet particular RTD values, while not sacrificing the strength of the filter segment for enduring the capsule activation process.

A ratio of the total cross-sectional area of the at least one filter channel to the total cross-sectional area of the filter segment may be at least 25%. In other words, the open area of the filter segment may be at least 25%. A ratio of the total cross-sectional area of the at least one filter channel to the total cross-sectional area of the filter segment may be at least 50%. A ratio of the total cross-sectional area of the at least one filter channel to the total cross-sectional area of the filter segment may be at least 75%. A ratio of the total cross-sectional area of the at least one filter channel to the total cross-sectional area of the filter segment may be at least 80%. In addition, the filter segment may itself be porous. Providing a large proportion of filter channels, or open area, ensures that the RTD, and RTD per unit length, of the filter segment is sufficiently low to ensure suitable capsule depletion. Further, this also allows a suitably rigid and strong material for the filter segment that is able to endure the piercing force exerted on the capsule and the filter segment, while also being able to provide low RTD characteristics.

The filter channels of the filter segment are preferably smaller than a diameter of the capsule. Accordingly, a width of a filter channel may be less than a diameter of the capsule. Such a diameter of the capsule refers to the largest diameter of the capsule. A width of a filter channel may be smaller than 6 mm, more preferably smaller than 5.5 mm and even more preferably smaller than 5 mm.

The filter segment may not consist of a hollow tubular segment, which defines a single unobstructed air flow channel between its upstream and downstream ends and has a wall thickness below 1 mm. Such a hollow tubular segment would effectively provide an RTD, and an RTD per unit length, of 0 mm of water. This would be too low in order to provide a pleasant experience for a user and the hollow tubular segment may not be capable of retaining a capsule within the cavity during activation and use.

The Young's modulus (or elastic modulus) of the material of the filter segment may be greater than, or at least, about 10 MPa. Unless otherwise specified, the Young's modulus of the filter segment material is measured in accordance with ASTM E111-17. The Young's modulus (or elastic modulus) of the material of the filter segment may be greater than, or at least, about 20 MPa. The Young's modulus (or elastic modulus) of the material of the filter segment may be greater than, or at least, about 30 MPa. The Young's modulus (or elastic modulus) preferably refers to the Young's modulus of the material of a component along the longitudinal axis, or direction, of the component.

The capsule may be defined by having a particular puncture strength (in Newtons). The puncture strength of the capsule refers to the particular piercing or puncture force (in Newtons) a piercing element or needle is required to exert on the capsule in order to pierce or activate the capsule. Methods for measuring the puncture strength of the capsule are known to the skilled person. For example, the puncture strength of the capsule may be measured in accordance with ASTM F1306-16. The piercing element or needle may be between 27 gauge (outer diameter=0.42 mm) to 4 gauge (outer diameter=5 mm). For example, the puncture strength of a sample capsule may be measured with a 3.2 mm (8 gauge) diameter piercing element or hemispherical probe.

The filter segment may be configured to sustain a force of at least about 50% of the puncture strength of the capsule being applied to the upstream end of the filter segment without deforming substantially. The filter segment may be configured to sustain a force of up to about 100% of the puncture strength of the capsule being applied to the upstream end of the filter segment without deforming substantially. The filter segment may be configured to sustain a force of up to about 200% of the puncture strength of the capsule being applied to the upstream end of the filter segment without deforming substantially. The filter segment may be configured to sustain a force of at least 50% of the puncture strength of the capsule to about 100% of the puncture strength of the capsule being applied to the upstream end of the filter segment without deforming substantially. The filter segment may be configured to sustain a force of at least 50% of the puncture strength of the capsule to about 200% of the puncture strength of the capsule being applied to the upstream end of the filter segment without deforming substantially.

The filter segment (or element) may extend from the cavity to the downstream end of the inhaler article. In other words, the length of the downstream section of the inhaler article is the same as the length of the filter segment.

The length of the filter segment may be greater than, or at least, about 10 mm. The length of the filter segment may be greater than, or at least, about 15 mm. The length of the filter segment may be greater than, or at least, about 20 mm. The length of the filter segment may be less than about 30 mm. The length of the filter segment may be between about 10 mm and 30 mm. The length of the filter segment may be between about 10 millimetres and about 20 millimetres.

Preferably, the length of the filter segment may be between about 15 mm and 20 mm. The length of the filter segment may be about 17 mm.

The inhaler article may have an outer diameter in a range from about 6 mm to about 10 mm, or from about 7 mm to about 10 mm, or about 7 mm to about 9 mm, or about 7 mm to about 8 mm or about 7.2 mm. The inhaler article may have a length (along the longitudinal axis) in a range from about 40 mm to about 100 mm, or from about 40 mm to about 80 mm, or about 40 mm to about 60 mm. Preferably, the length of the inhaler article is about 45 mm. Preferably, the length of the inhaler article is selected such that the mouthpiece end of the inhaler article protrudes from a holder of the inhaler system, which is described in more detail below.

The (distal, front or upstream) end plug may extend from the upstream end of the inhaler article to the cavity.

The end plug may define at least one air flow inlet channel (or air inlet) extending from the upstream end of the inhaler article, or end plug, to the cavity such that the fluid communication between the cavity and the exterior of the inhaler article is established.

The end plug may define a central, piercing channel extending from the distal end of the inhaler article towards the capsule cavity. The end plug may comprise a central channel extending through the body of the end plug. The central channel may be configured to provide access to the cavity to a piercing element, as described in the present disclosure. The piercing central channel of the end plug may be co-axial with the longitudinal axis of the inhaler article. The linear piercing channel may be sized to allow a piercing element to pass through the linear piercing channel.

The end plug may include a resealable element disposed on or within the central channel. The resealable element, such as a septum or resealable membrane, may be disposed at either end of the central piercing channel.

Advantageously, providing a piercing channel along the end plug allows reliable piercing of a capsule contained within the capsule cavity. Furthermore, the resealable element maintains the integrity of the desired air flow pattern within the capsule cavity.

The resealable element may seal the central channel. The resealable element may form a hermetic or airtight seal or barrier along the central channel. The central channel may be formed of a pierceable material. A piercing element may pass through the resealable element and puncture the capsule within the capsule cavity. The resealable element may reseal once the piercing element is retracted or removed from the resealable element. Resealable elements or membranes may include a septum or septum-like element. Resealable elements or membranes may be formed of elastic material such as rubber, silicone, metal foil co-laminated with a polymer, or latex and the like.

The end plug may include at least one air flow inlet channel allowing air to enter into the cavity of the inhaler article.

The at least one air flow inlet channel may extend in a direction that is tangential to the central channel. In such embodiments, air may enter into the central channel via a side of the inhaler article. However, it is preferable in the present disclosure that the air flow inlet channel extend along the body of the end plug in a non-parallel direction to the longitudinal axis of the inhaler article.

The at least one air flow inlet channel may extend from the end plug distal end or distal end face, to the end plug inner end or inner end face. The air flow inlet channel may extend the length of the end plug body. The air flow inlet channel may extend from the end plug distal end or distal end face, to the end plug inner end or inner end face and define a curved, helical, spiral or arcuate path. The air flow inlet channel may extend from the end plug distal end or distal end face, to the end plug inner end or inner end face and define a curved, helical, spiral or arcuate path along an outer surface of the end plug body. The at least one air flow inlet channel may extend both in the longitudinal direction along the end plug and the circumferential direction around the end plug. In the other words, the at least one air flow inlet channel may extend in a direction that is non-parallel to the longitudinal axis of the inhaler article and the end plug. Accordingly, the at least one air flow inlet channel may follow a spiral, helical, arcuate or curved profile along the outer surface of the end plug body.

The air inlet channel that is curved, helical, spiral or arcuate may be configured to induce a swirling air flow pattern within the capsule cavity of the inhaler article. The air inlet channel may draw inlet air into the capsule cavity of the inhaler article from the end plug distal end. The air inlet channel may induce rotational air flow or swirling air flow as the air flows through the air inlet channels and through the capsule cavity. Air flow through the inhaler article preferably enters the inhaler article at the distal end face or end plug distal end of the inhaler article and moves along the longitudinal axis of the inhaler article to the mouth or downstream end in a swirling air flow pattern. An inlet of the air flow channel may be defined within the end plug distal end face. The end plug distal end face may be orthogonal to the longitudinal axis of the inhaler article.

The air inlet channel may be continuously non-parallel with the longitudinal axis of the inhaler article along an entire length of the air inlet channel. The air inlet channel may be parallel along a portion of the length of the air inlet channel and non-parallel along a remaining portion of the length of the air inlet channel. The air inlet channel may be parallel for a first portion or upstream portion of the air inlet channel and be non-parallel for a second portion or downstream portion of the air inlet channel exiting into the capsule cavity. The second portion may define a about 50% or less, or from about 5% to about 50%, or from about 10% to about 30% of the total air inlet channel length.

The end plug may be inserted into the distal end of the inhaler article and may be fixed to, or within, the inhaler article by friction fit or interference fit. A distal end portion of the inhaler article, such as the hollow tubular element (described below), may cooperate with the end plug air inlet channel to enclose the air inlet channel or form the remainder of the air inlet channel.

The air inlet channel may extend a distance along an arc that is co-axial with the longitudinal axis. The air inlet channel may be curved with respect the longitudinal axis of the inhaler article. The air inlet channel may rotate around the circumference of the end plug as a function of a location along the end plug. The air inlet channel may rotate around about 5% to about 100%, or about 25% to about 50% of the circumference of the end plug. The air inlet channel may rotate around the circumference of the end plug an arc length (distance when viewing the end plug from the distal end face) having a central angle (that may be coincident with the longitudinal axis of the inhaler article) in a range from about or from about 5 degrees to about 360 degrees, or about 45 degrees to about 180 degrees, or from about 45 degrees to about 135 degrees.

The air inlet channel may enter the capsule cavity at an angle relative to the longitudinal axis. The air inlet channel may enter the capsule cavity at an angle in a range from about 5 degrees to about 89 degrees, or about 45 degrees to about 89 degrees, or about 60 degrees to about 89 degrees, or about 70 degrees to about 88 degrees. The air inlet channel may have a first portion parallel with the longitudinal axis and a second portion exiting into the capsule cavity at an angle relative to the longitudinal axis as described above.

The end plug may include at least two, or two or more air inlet channels formed into the end plug body. The end plug may include at least three, or three or more air inlet channels formed into the end plug body. The air inlet channels may be located symmetrically about the end plug. The air inlet channels may oppose each other about the end plug along the end plug length. The one or more air inlet channels may have a helical shape (forming a portion of a spiral). The helical air inlet channels may be symmetrically disposed along the end plug length and preferably oppose each other along the end plug length. The air inlet channels may each extend a distance along an arc that are each co-axial with the longitudinal axis.

The at least one air flow inlet channel (or air inlet) may comprise two air flow inlet channels configured to generate a swirling air flow within the cavity. This rotational or swirling air flow is transmitted to a capsule cavity of an inhaler article. The rotational or swirling air flow induces a capsule contained within the capsule cavity to rotate and release inhalable material particles into the rotational or swirling air flow, which is directed downstream through the filter segment and to a consumer.

The end plug, and the air inlet channel(s) defined thereon, may be precisely designed and manufactured to impart the desired air flow pattern through the capsule cavity of the inhaler article.

The body of the inhaler article, or the "inhaler article", may have any suitable shape. The body of the inhaler article, or "inhaler article" may resemble a smoking article or conventional cigarette in size and shape. The inhaler article may have a substantially uniform outer diameter along the length of the inhaler article. The inhaler article may have a substantially uniform inner diameter along the length of the inhaler article. The inhaler article may have any suitable transverse cross-sectional shape. For example, the transverse cross-section may be circular, elliptical, square or rectangular. The inhaler article preferably has a circular cross-section that may be uniform along the length of the inhaler article, forming an elongated cylindrical body.

The inhaler article may comprise a hollow tubular element extending from the upstream end of the inhaler article to the filter segment so that the end plug and the capsule may be located within the hollow tubular element. The hollow tubular element may be formed of a polymeric or cellulosic material, or any other suitable material. The inhaler article may be formed of a biodegradable material. Preferably, the inhaler article may be formed of paperboard or cardboard. The hollow tubular element may have a uniform thickness along its length. The hollow tubular element may have a thickness in a range from about 1 mm to about 2 mm.

The end plug may include a collar portion having a larger diameter than the remaining body of the end plug. The collar portion may function as a physical stop to ensure proper placement of the end plug within the distal end portion of the hollow tubular element. The collar portion may abut the elongated inhaler article. The collar portion may have a diameter that is about 0.5 mm to about 1 mm greater than the diameter than the remaining body of the end plug. The collar portion may have a diameter that is substantially similar or the same as the outer diameter of the hollow tubular element or the inhaler article.

The inhaler article may comprise a filter wrapper circumscribing the filter segment of the downstream section. The inhaler article may comprise a wrapping material, or inhaler article wrapper, circumscribing the hollow tubular element and the downstream section. The wrapping material may secure the downstream section in axial alignment with the end plug. The wrapping material may be formed from a biodegradable material. The wrapping material may be formed from a paper wrapper.

The end plug may have a length in a range from about 3 mm to about 12 mm, or from about 4 mm to about 10 mm, or from about 5 mm to about 9 mm, or about 8 mm. The end plug may have an outer diameter sufficient to form a close or friction fit with the inner diameter of the hollow tubular element. The end plug may have an outer diameter in a range from about 5 mm to about 10 mm, or from about 6 mm to about 9 mm, or about 6.5 mm to about 8.5 mm, or about 7.5 mm. The length of the central channel may be equal to the length of the end plug.

The end plug may be disposed at the distal end of the body. The end plug may define the distal end of the inhaler article. Preferably, the at least one air inlet of the end plug is proximate to the distal or upstream end of the inhaler article. The central channel may include a first end defining an upstream boundary of the capsule cavity and a second opposing end defining the distal end of the inhaler article body. Preferably, the second opposing end defines an open distal end of the of the inhaler article body. The central channel may extend along the longitudinal axis of the inhaler article and define an opening at the distal end of the inhaler article that is coaxial with the longitudinal axis of the inhaler article.

Advantageously, the end plug may comprise an open aperture along the longitudinal axis and may not have an element blocking or occluding the open distal end of the inhaler article, in order to reduce the complexity of the inhaler article. The consumer may simply occlude or block the open distal end with a holder or the consumer's finger to direct inhalation air flow substantially through the air inlets on the inhaler article, once the capsule has been pierced.

Preferably the end plug is formed of a biodegradable material. Preferably the end plug comprises a fibrous material. Preferably the end plug is formed of a porous material. Preferably the end plug is formed of a cellulose material, such as cellulose acetate. Preferably, the end plug is formed of a polylactic acid material. Advantageously, the end plug may be formed of materials used to assemble conventional cigarettes. Advantageously, the inhaler article may be formed of biodegradable materials.

Air flow through the inhaler article preferably enters the inhaler article through the inhaler article upstream end via the air flow inlet channels and then along the longitudinal axis of the inhaler article, via the capsule cavity and filter segment, to exit at the mouthpiece or downstream end of the inhaler article.

The central channel may have a uniform inner or open diameter extending from the capsule cavity to the open distal end or upstream-most end of the inhaler article. The central channel may have a diameter that is at least about 50%, or at least about 70%, or at least about 75% of a diameter of the inhaler article. The central channel may have a diameter in a range from about 3 mm to about 6.5 mm, or from about 4 mm to about 6 mm, or from about 5 mm to about 6 mm or about 5.5 mm. Alternatively, the central channel may have a diameter in a range from about 0.5 mm to about 2 mm.

Preferably, a capsule is retained within the capsule cavity. The central channel may have a uniform diameter extending from the capsule cavity to the open distal end or upstream-most end of the inhaler article or end plug. The central channel may have a diameter that is at least about 50%, or at least about 70%, or at least about 75% of a diameter of the body distal end. The central channel of the end plug may have a diameter that is in a range from about 50% to about 90% of a diameter of the capsule retained within the capsule cavity. Such sizing of the central channel ensures that the capsule may not fall out of the inhaler article via the central channel of the end plug.

As discussed above, the end plug may induce rotational air flow or swirling air flow as the air is drawn through the air flow inlet channels of the end plug and through the capsule cavity. Advantageously, this swirling air flow produced by the air flow inlet channels of the end plug is useful for effective depletion of the capsule during consumption, after the capsule has been pierced. Advantageously, the "swirling" effect may cause agitation or rotation of the capsule to provide a uniform entrainment of a portion or a fraction of nicotine particles from the capsule over two or more, or five or more, or ten or more inhalations or "puffs" by a user.

The inhalable material may comprise nicotine. Preferably, the capsule contains pharmaceutically active particles. The pharmaceutically active particles may comprise nicotine. The pharmaceutically active particles may have a mass median aerodynamic diameter of about 5 micrometres or less, or in a range from about 0.5 micrometres to about 4 micrometres, or in a range from about 1 micrometres to about 3 micrometres.

Advantageously, the inhaler article efficiently provides nicotine particles to the lungs at inhalation or air flow rates that are within conventional smoking regime inhalation or air flow rates. The inhaler delivers the nicotine article with an inhaler article that has a form similar to a conventional cigarette. The inhaler article or system described herein may provide a dry powder to the lungs at inhalation or air flow rates that are within conventional smoking regime inhalation or air flow rates. A consumer may take a plurality of inhalations or "puffs" where each "puff" delivers a fractional amount of dry powder contained within a capsule contained within the capsule cavity. This inhaler article may have a form similar to a conventional cigarette and may mimic the ritual of conventional smoking. This inhaler article may be simple to manufacture and convenient to use by a consumer.

Air flow management through a capsule cavity of the inhaler article may cause a capsule contained therein to rotate during inhalation and consumption. The capsule may contain particles containing nicotine (also referred to as "nicotine powder" or "nicotine particles") and optionally particles comprising flavour (also referred to as "flavour particles"). Rotation of the pierced capsule may suspend and aerosolize the nicotine particles released from the pierced capsule into the inhalation air moving through the inhaler article. The flavour particles may be larger than the nicotine particles and may assist in transporting the nicotine particles into the lungs of the user while the flavour particles preferentially remain in the mouth or buccal cavity of the user. The nicotine particles and optional flavour particles may be delivered with the inhaler article at inhalation or air flow rates that are within conventional smoking regime inhalation or air flow rates.

The term "nicotine" refers to nicotine and nicotine derivatives such as free-base nicotine, nicotine salts and the like.

The term "flavourant" or "flavour" refers to organoleptic compounds, compositions, or materials that alter and are intended to alter the taste or aroma characteristics of nicotine during consumption or inhalation thereof.

According to another aspect of the present disclosure, there is provided an inhaler system comprising an inhaler article as described herein and a holder for receiving the inhaler article. The holder comprises a housing defining a housing cavity configured to receive the inhaler article. The holder comprises a piercing element configured to extend into the housing cavity and to pierce the capsule of the inhaler article.

The holder may comprise a piercing element extending into the housing cavity configured to pierce the capsule of the inhaler article.

The holder for an inhaler article may be combined with an inhaler article (described herein) containing a capsule for activating the inhaler article by piercing the capsule, providing reliable activation of the capsule (by puncturing the capsule with the piercing element of the holder) within inhaler article, and releasing the particles contained inside the capsule and enabling the article to deliver the particles to a consumer. The holder is separate from the inhaler article, but the consumer may utilize both the inhaler article and the holder while consuming the particles released within the inhaler article. A plurality of these inhaler articles may be combined with a holder to form a system or kit. A single holder may be utilized on 10 or more, or 25 or more, or 50 or more, or 100 or more, inhaler articles to activate (puncture or pierce) a capsule contained within each inhaler article and provide reliable activation and optionally, a visual indication (marking), for each inhaler article of the activation of the inhaler article.

A holder for an inhaler article includes a housing comprising a housing cavity for receiving an inhaler article and a sleeve configured to retain an inhaler article within the housing cavity. The sleeve comprising a sleeve cavity and being movable within the housing cavity along the longitudinal axis of the housing. The sleeve comprises a first open end and a second opposing end. The first open end is configured to receive the distal end of the inhaler article. The second opposing end of the sleeve is configured to contact the distal end of the inhaler article. The sleeve second opposing end is configured to direct substantially all inhalation air to flow through the inhaler article via the at least one air inlet extending in a direction that is non-parallel to the central channel.

An inhaler system includes the inhaler article described herein with a capsule disposed within the capsule cavity and a holder receiving the inhaler article. The holder includes a housing having a housing cavity for receiving an inhaler article and a sleeve configured to retain an inhaler article within the housing cavity. The sleeve includes a sleeve cavity and the sleeve is movable within the housing cavity along a longitudinal axis of the housing. The sleeve includes a first open end and a second opposing end. The first open end is configured to receive an inhaler article and the second opposing end of the sleeve is configured contact the distal end of the inhaler article.

A method includes, inserting an inhaler article into the sleeve of the holder for an inhaler article, as described herein, until the distal end of the inhaler article contacts the second opposing end of the sleeve. The inhaler article includes a body, the body extending along an inhaler longitudinal axis from a mouthpiece end to a distal end, a body length, and a capsule disposed within the inhaler article body. Then, moving the inhaler article and sleeve toward the piercing element until the piercing element pierces the capsule. Then drawing air into the second opposing end of the sleeve of the holder to direct inhalation air flow into the air inlets on the inhaler article to form rotational or swirling air flow through the cavity of the inhaler article. This swirling inhalation air flow is transmitted into the capsule cavity while the inhaler article is disposed within the holder for an inhaler article. The consumed inhaler article may then be removed from the holder and discarded. Then a fresh inhaler article may be inserted into the holder and the method repeated.

The inhaler article described herein may be combined with a piercing element or holder including a piercing element to deliver the nicotine particles from the capsule to a user. The piercing element or piercing device (or holder) may be separated from or not form a portion of the inhaler article. A plurality of the inhaler articles may be combined with a piercing element or piercing device (or holder) to form a kit.

The holder includes a housing having a housing cavity for receiving an inhaler article and a sleeve configured to retain an inhaler article within the housing cavity. The sleeve includes a sleeve cavity and the sleeve is movable within the housing cavity along a longitudinal axis of the housing. The sleeve includes a first open end and a second opposing end. The first open end is configured to receive an inhaler article and the second opposing end of the sleeve is configured to contact the distal end of the inhaler article.

Preferably the sleeve second opposing end is configured to direct substantially all inhalation air to flow through the inhaler article at least one air inlet extending in a direction that is non-parallel to the central channel.

Advantageously, the holder may cooperate with the inhaler article to direct substantially all of the inhalation air flow through the air inlets of the end plug of the inhaler article.

Preferably the holder further includes a piercing element fixed to and extending from a housing inner surface. The piercing element is configured to extend through the second opposing end of the sleeve and into the capsule cavity to pierce the capsule along a longitudinal axis of the housing.

A capsule may be sealed within the inhaler article prior to consumption. For transport and storage, the inhaler article may be contained within a sealed or airtight container or bag. The inhaler article may include one or more peelable seal layers to cover the one or more air inlet channels at the distal end or the air outlet at the mouthpiece end of the inhaler article. This may ensure the inhaler articles maintain appropriate hygiene and freshness or may prevent the capsule from drying out and becoming hard or friable.

The capsule may rotate about its longitudinal or central axis when air is drawn through the inhaler article. The capsule may be formed of an airtight material that substantially contains the particles inside the capsule. The capsule may be configured to be pierced or punctured by a piercing element when the capsule is within the capsule cavity. The piercing element may be separate or combined with the inhaler article. The capsule may be formed of any suitable material. The capsule may be formed of a metallic or polymeric material that serves to keep contaminants out of the capsule but may be pierced or punctured by a piercing element prior to consumption to enable the release of the nicotine particles from within the capsule. The capsule may be formed of a polymer material. The polymer material may be hydroxypropylmethylcellulose (HPMC). The capsule may be any suitable size. The capsule may be a size 1 to size 4 capsule, or a size 3 capsule, or a size 3 capsule.

The system may comprise a separate piercing element, such as a metal or rigid needle. The piercing element may form a single aperture through the capsule received in the capsule cavity. The piercing element may be configured to pass through the end plug, precisely the central piercing channel thereof, and into the capsule cavity.

The holder for an inhaler article may be combined with an inhaler article (as described herein) containing a capsule for activating the inhaler article by piercing the capsule, providing reliable activation of the capsule (by puncturing the capsule with the piercing element of the holder) within inhaler article, and releasing the particles contained inside the capsule and enabling the article to deliver the particles to a consumer. The holder is separate from the inhaler article, but the consumer may utilize both the inhaler article and the holder while consuming the particles released within the inhaler article. A plurality of these inhaler articles may be combined with a holder to form a system or kit. A single holder may be utilized on 10 or more, or 25 or more, or 50 or more, or 100 or more, inhaler articles to activate (puncture or pierce) a capsule contained within each inhaler article and provide reliable activation and optionally, a visual indication (marking), for each inhaler article of the activation of the inhaler article.

A holder for an inhaler article includes a housing comprising a housing cavity for receiving an inhaler article and a sleeve configured to retain an inhaler article within the housing cavity. The sleeve comprising a sleeve cavity and being movable within the housing cavity along the longitudinal axis of the housing. The sleeve comprises a first open end and a second opposing end. The first open end is configured to receive the distal or upstream end of the inhaler article. The second opposing end of the sleeve is configured to contact the distal end of the inhaler article. The sleeve second opposing end is configured to direct substantially all inhalation air to flow through the inhaler article at least one air inlet extending in a direction that is non-parallel to the central channel of the end plug.

An inhaler system may include the inhaler article described herein with a capsule disposed within the capsule cavity and a holder receiving the inhaler article. The holder includes a housing having a housing cavity for receiving an inhaler article and a sleeve configured to retain an inhaler article within the housing cavity. The sleeve includes a sleeve cavity and the sleeve is movable within the housing cavity along a longitudinal axis of the housing. The sleeve includes a first open end and a second opposing end. The first open end is configured to receive an inhaler article and the second opposing end of the sleeve is configured contact the distal end of the inhaler article.

The holder may further comprise a piercing element fixed to and extending from a housing inner surface. The piercing element may be configured to extend through the second opposing end of the sleeve and into the capsule cavity to pierce the capsule along a longitudinal axis of the housing.

The holder may further include a spring element configured to bias the sleeve toward the open proximal end of the housing, and between relaxed and compressed positions. The spring element may be contained within the housing cavity (also referred to as inhaler article cavity) of the holder and be compressed as the movable sleeve and inhaler article move toward the piercing element. The spring element may be located between the sleeve and distal end of the housing and contact the sleeve and distal end of the housing. The spring element may be between the distal end of the sleeve and the distal end of the housing. The spring element may contact the distal end of the sleeve and the distal end of the housing. The spring element may be disposed about the piercing element. The spring element may be co-axial with the piercing element. The spring element may be a conical spring.

The spring element biases the inhaler article away from the piercing element. In use, a user may insert an inhaler article into the inhaler article cavity of the holder. By doing this, the spring may be compressed allowing the inhaler article to move towards the distal end of the inhaler article cavity. Eventually, the piercing element may penetrate a capsule disposed within the inhaler article. Once this happens, the user may release the inhaler article, allowing the spring to bias the inhaler article towards the proximal end of the inhaler article cavity and away from the piercing element. The user may then inhale on the proximal end of the inhaler article.

The sleeve may define a first air inlet zone comprising at least one air aperture through the sleeve. The first air inlet zone is proximate to a proximal end of the sleeve. The first air inlet zone is configured to allow air to flow from an inside of the sleeve to an air flow channel formed between the sleeve and the housing inner surface. The sleeve may comprise a second air inlet zone comprising at least one air aperture through the sleeve. The second air inlet zone is proximate to a distal end of the sleeve. The second air inlet zone is configured to allow air to flow from the air flow channel to an inside of the sleeve.

The holder may include a marking element that extends into the housing (or inhaler article) cavity. The marking element may be configured to mark the surface of an inhaler article. The marking element may extend orthogonally to the holder or inhaler article longitudinal axis. The marking element may be configured to mark the outer surface of an inhaler article in a mechanical manner. For example, the marking element may be configured to scratch, cut, abrade, score, fold, or bend the outer surface of the inhaler article. The marking element may have a sharp end configured to scratch the inhaler outer surface when received within the housing cavity. The marking element may apply a colour to the inhaler article outer surface when received within the housing cavity. The marking element may mark the inhaler article outer surface when the piercing element penetrates a capsule disposed within the inhaler article. Thus, indicating that the inhaler article has been activated and may be consumed by a user. This may also advantageously prevent a user trying to reuse an inhaler article which has already been previously activated.

The marking element may extend orthogonally to the holder or inhaler article longitudinal axis. The marking element may be formed of a rigid material configured to provide a visual indication that the marking element has contacted the inhaler outer surface. The marking element may be fixed to the holder housing. The marking element may form the alignment pin, as described above.

The marking element may extend though at least a portion of a thickness of the holder. The marking element may extend through the sleeve. The marking element may extend into the housing cavity and into the sleeve. The marking element may extend beyond the at least the sleeve a marking distance so that the marking element contacts the inhaler outer surface when the inhaler article is received within the housing cavity. The marking element may be aligned with and mate with an elongated slot of the sleeve.

The capsule may contain pharmaceutically active particles comprising nicotine (also referred to as "nicotine powder" or "nicotine particles") and optionally particles comprising flavour (also referred to as "flavour particles). The capsule may contain a predetermined amount of nicotine particles and optional flavour particles. The capsule may contain enough nicotine particles to provide at least 2 inhalations or "puffs", or at least about 5 inhalations or "puffs", or at least about 10 inhalations or "puffs". The capsule may contain enough nicotine particles to provide from about 5 to about 50 inhalations or "puffs", or from about 10 to about 30 inhalations or "puffs". Each inhalation or "puff" may deliver from about 0.1 mg to about 3 mg of nicotine particles to the lungs of the user or from about 0.2 mg to about 2 mg of nicotine particles to the lungs of the user or about 1 mg of nicotine particles to the lungs of the user.

The nicotine particles may have any useful concentration of nicotine based on the particular formulation employed. The nicotine particles may have at least about 1% wt nicotine up to about 30% wt nicotine, or from about 2% wt to about 25% wt nicotine, or from about 3% wt to about 20% wt nicotine, or from about 4% wt to about 15% wt nicotine, or from about 5% wt to about 13% wt nicotine. Preferably, about 50 to about 150 micrograms of nicotine may be delivered to the lungs of the user with each inhalation or "puff".

The capsule may hold or contain at least about 5 mg of nicotine particles or at least about 10 mg of nicotine particles. The capsule may hold or contain less than about 900 mg of nicotine particles, or less than about 300 mg of nicotine particles, or less than 150 mg of nicotine particles. The capsule may hold or contain from about 5 mg to about 300 mg of nicotine particles or from about 10 mg to about 200 mg of nicotine particles.

When flavour particles are blended or combined with the nicotine particles within the capsule, the flavour particles may be present in an amount that provides the desired flavour to each inhalation or "puff" delivered to the user.

The nicotine particles may have any useful size distribution for inhalation delivery preferentially into the lungs of a user. The capsule may include particles other than the nicotine particles. The nicotine particles and the other particles may form a powder system.

The capsule may hold or contain at least about 5 mg of a dry powder (also referred to as a powder system) or at least about 10 mg of a dry powder. The capsule may hold or contain less than about 900 mg of a dry powder, or less than about 300 mg of a dry powder, or less than about 150 mg of a dry powder. The capsule may hold or contain from about 5 mg to about 300 mg of a dry powder, or from about 10 mg to about 200 mg of a dry powder, or from about 25 mg to about 100 mg of a dry powder.

The dry powder or powder system may have at least about 40%, or at least about 60%, or at least about 80%, by weight of the powder system comprised in nicotine particles having a particle size of about 5 micrometres or less, or in a range from about 1 micrometre to about 5 micrometres.

The particles comprising nicotine may have a mass median aerodynamic diameter of about 5 micrometres or less, or in a range from about 0.5 micrometres to about 4 micrometres, or in a range from about 1 micrometres to about 3 micrometres or in a range from about 1.5 micrometres to about 2.5 micrometres. The mass median aerodynamic diameter is preferably measured with a cascade impactor.

The particles comprising flavour may have a mass median aerodynamic diameter of about 20 micrometres or greater, or about 50 micrometres or greater, or in a range from about 50 to about 200 micrometres, or from about 50 to about 150 micrometres. The mass median aerodynamic diameter is preferably measured with a cascade impactor.

The dry powder may have a mean diameter of about 60 micrometres or less, or in a range from about 1 micrometres to about 40 micrometres, or in a range from about 1.5 micrometres to about 25 micrometres. The mean diameter refers to the mean diameter per mass and is preferably measured by laser diffraction, laser diffusion or an electronic microscope.

Nicotine in the powder system or nicotine particles may be a pharmaceutically acceptable free-base nicotine, or nicotine salt or nicotine salt hydrate. Useful nicotine salts or nicotine salt hydrates include nicotine pyruvate, nicotine citrate, nicotine aspartate, nicotine lactate, nicotine bitartrate, nicotine salicylate, nicotine fumarate, nicotine monopyruvate, nicotine glutamate or nicotine hydrochloride, for example. The compound combining with nicotine to form the salt or salt hydrate may be chosen based on its expected pharmacological effect.

The nicotine particles preferably include an amino acid. Preferably the amino acid may be leucine such as L-leucine. Providing an amino acid such as L-leucine with the particles comprising nicotine, may reduce adhesion forces of the particles comprising nicotine and may reduce attraction between nicotine particles and thus reduce agglomeration of nicotine particles. Similarly, adhesion forces to particles comprising flavour may also be reduced thus agglomeration of nicotine particles with flavour particles is also reduced. The powder system described herein thus may be a free-flowing material and possess a stable relative particle size of each powder component even when the nicotine particles and the flavour particles are combined.

Preferably, the nicotine may be a surface modified nicotine salt where the nicotine salt particle comprises a coated or composite particle. A preferred coating or composite material may be L-leucine. One particularly useful nicotine particle may be nicotine bitartrate with L-leucine.

The powder system may include a population of flavour particles. The flavour particles may have any useful size distribution for inhalation delivery selectively into the mouth or buccal cavity of a user.

The powder system may have at least about 40%, or at least about 60%, or at least about 80%, by weight of the population of flavour particles of the powder system comprised in particles having a particle size of about 20 micrometres or greater. The powder system may have at least about 40% or at least about 60%, or at least about 80%, by weight of the population of flavour particles of the powder system comprised in particles having a particle size of about 50 micrometres or greater. The powder system may have at least about 40% or at least about 60%, or at least about 80%, by weight of the population of flavour particles of the powder system comprised in particles having a particle size in a range from about 50 micrometre to about 150 micrometres.

The particles comprising flavour may include a compound to reduce adhesion forces or surface energy and resulting agglomeration. The flavour particle may be surface modified with an adhesion reducing compound to form a coated flavour particle. One preferred adhesion reducing compound may be magnesium stearate. Providing an adhesion reducing compound such as magnesium stearate with the flavour particle, especially coating the flavour particle, may reduce adhesion forces of the particles comprising flavour and may reduce attraction between flavour particles and thus reduce agglomeration of flavour particles. Thus, agglomeration of flavour particles with nicotine particles may also be reduced. The powder system described herein thus may possess a stable relative particle size of the particles comprising nicotine and the particles comprising flavour even when the nicotine particles and the flavour particles are combined. The powder system preferably may be free flowing.

Conventional formulations for dry powder inhalation contain carrier particles that serve to increase the fluidization of the active particles since the active particles may be too small to be influenced by simple air flow though the inhaler. The powder system may comprise carrier particles. These carrier particles may be a saccharide such as lactose or mannitol that may have a particle size greater than about 50 micrometres. The carrier particles may be utilized to improve dose uniformity by acting as a diluent or bulking agent in a formulation.

The powder system utilized with the nicotine powder delivery system described herein may be carrier-free or substantially free of a saccharide such as lactose or mannitol. Being carrier-free or substantially free of a saccharide such as lactose or mannitol may allow the nicotine and to be inhaled and delivered to the user's lungs at inhalation or air flow rates that are similar to typical smoking regime inhalation or air flow rates.

The nicotine particles and a flavour may be combined in a single capsule. As described above, the nicotine particles and a flavour may each have reduced adhesion forces that result in a stable particle formulation where the particle size of each component does not substantially change when combined. Alternatively, the powder system includes nicotine particles contained within a single capsule and the flavour particles contained within a second capsule.

The nicotine particles and flavour particles may be combined in any useful relative amount so that the flavour particles are detected by the user when consumed with the nicotine particles. Preferably the nicotine particles and a flavour particles form at least about 90% wt or at least about 95% wt or at least about 99% wt or 100% wt of the total weight of the powder system.

The inhaler and inhaler system may be less complex and have a simplified air flow path as compared to conventional dry powder inhalers. Advantageously, rotation of the capsule within the inhaler article aerosolizes the nicotine particles or powder system and may assist in maintaining a free-flowing powder. Thus, the inhaler article may not require the elevated inhalation rates typically utilized by conventional inhalers to deliver the nicotine particles described above deep into the lungs.

The inhaler article may use a flow rate of less than about 5 L/min or less than about 3 L/min or less than about 2 L/min or about 1.6 L/min. Preferably, the flow rate may be in a range from about 1 L/min to about 3 L/min or from about 1.5 L/min to about 2.5 L/min. Preferably, the inhalation rate or flow rate may be similar to that of Health Canada smoking regime, that is, about 1.6 L/min.

The inhaler system may be used by a consumer like smoking a conventional cigarette or vaping an electronic cigarette. Such smoking or vaping may be characterized by two steps: a first step during which a small volume containing the full amount of nicotine desired by the consumer is drawn into the mouth cavity, followed by a second step during which this small volume comprising the aerosol comprising the desired amount of nicotine is further diluted by fresh air and drawn deeper into the lungs. Both steps are controlled by the consumer. During the first inhalation step the consumer may determine the amount of nicotine to be inhaled. During the second step, the consumer may determine the volume for diluting the first volume to be drawn deeper into the lungs, maximizing the concentration of active agent delivered to the airway epithelial surface. This smoking mechanism is sometimes called "puff-inhale-exhale".

The dry powder utilized with the dry powder inhaler of the disclosure may eliminate or substantially reduce any exhalation of pharmaceutically active particles during the "exhale" phase. Preferably nearly all, or at least about 99% or at least about 95% or at least 90% of the pharmaceutically active particle has a particle size that is delivered to the lungs but are not small enough to be exhaled by tidal breathing. This pharmaceutically active particle size may be in a range from about 0.75 micrometres to about 5 micrometres, or from 0.8 micrometres to about 3 micrometres, or from 0.8 micrometres to about 2 micrometres.

Below, there is provided a non-exhaustive list of non-limiting examples. Any one or more of the features of these examples may be combined with any one or more features of another example, embodiment, or aspect described herein.

Example 1

An inhaler article having an upstream end and a downstream end, the inhaler article comprising an upstream section, the upstream section comprising an end plug; a downstream section located downstream of the upstream section and spaced apart from the upstream section, the downstream section comprising a filter segment, a mouthpiece segment, a support segment, a downstream segment, or a retaining segment, wherein the resistance to draw per unit length of the filter segment, mouthpiece segment, support segment, downstream segment, or retaining segment is greater than 0 millimetres of water per millimetre and less than 3 millimetres of water per millimetre; a cavity defined between the upstream section and the downstream section, wherein the cavity is configured to be in fluid communication with the exterior of the inhaler article; and a capsule containing an inhalable material, wherein the capsule is located in the cavity.

Example 2

An inhaler article according to Example 1, wherein the resistance to draw per unit length of the filter segment, mouthpiece segment, support segment, downstream segment, or retaining segment is greater than 0 millimetres of water per millimetre and less than 1 millimetre of water per millimetre.

Example 3

An inhaler article according to Example 1 or 2, wherein the filter segment, mouthpiece segment, support segment, downstream segment, or retaining segment is configured to sustain a force of up to 15 Newtons being applied to its upstream end without deforming substantially.

Example 4

An inhaler article according to any preceding Example, wherein the Young's modulus of the material of the filter segment, mouthpiece segment, support segment, downstream segment, or retaining segment is greater than, or at least, 10 MPa.

Example 5

An inhaler article according to any preceding Example, where the resistance to draw of the filter segment, mouthpiece segment, support segment, downstream segment, or retaining segment is greater than 0 millimetres of water and less than 10 millimetres of water.

Example 6

An inhaler article according to any preceding Example, wherein the length of the filter segment, mouthpiece segment, support segment, downstream segment, or retaining segment is between 10 millimetres and 20 millimetres.

Example 7

An inhaler article according to any preceding Example, wherein the filter segment, mouthpiece segment, support segment, downstream segment, or retaining segment extends from the cavity to the downstream end of the inhaler article.

Example 8

An inhaler article according to any preceding Example, further comprising a hollow tubular element extending from the upstream end of the inhaler article to the filter segment, mouthpiece segment, support segment, downstream segment, or retaining segment, wherein the end plug and the capsule are located within the hollow tubular element.

Example 9

An inhaler article according to Example 8, wherein the inhaler article comprises a wrapping material circumscribing the hollow tubular element and the downstream section, wherein the wrapping material secures the downstream section in axial alignment with the hollow tubular element.

Example 10

An inhaler article according to any preceding Example, wherein the end plug defines at least one air flow inlet channel extending from the upstream end of the end plug to the cavity such that the fluid communication between the cavity and the exterior of the inhaler article is established.

Example 11

An inhaler article according to Example 10, wherein the at least one air flow inlet channel comprises two air flow inlet channels configured to generate a swirling air flow within the cavity.

Example 12

An inhaler article according to any preceding Example, wherein the filter segment, mouthpiece segment, support segment, downstream segment, or retaining segment comprises at least one filter air flow channel extending along the filter segment, mouthpiece segment, support segment, downstream segment, or retaining segment.

Example 13

An inhaler article according to any preceding Example, wherein the inhalable material comprises nicotine.

Example 14

An inhaler article according to any preceding Example, wherein the end plug comprises a central channel extending through the end plug, the central channel being configured to provide access to the cavity to a piercing element.

Example 15

An inhaler system comprising an inhaler article according to any one of the preceding Examples and a holder for receiving the inhaler article, the holder comprising a housing defining a housing cavity configured to receive the inhaler article; and a piercing element configured to extend into the housing cavity and pierce the capsule of the inhaler article.

The invention will now be further described with reference to the figures in which.

FIG. 5, FIG. 6, FIG. 7, FIG. 8, FIG. 9 and FIG. 10 each show front elevation views of different embodiments of a filter segment used in the inhaler article of the present disclosure.

Figure 1:
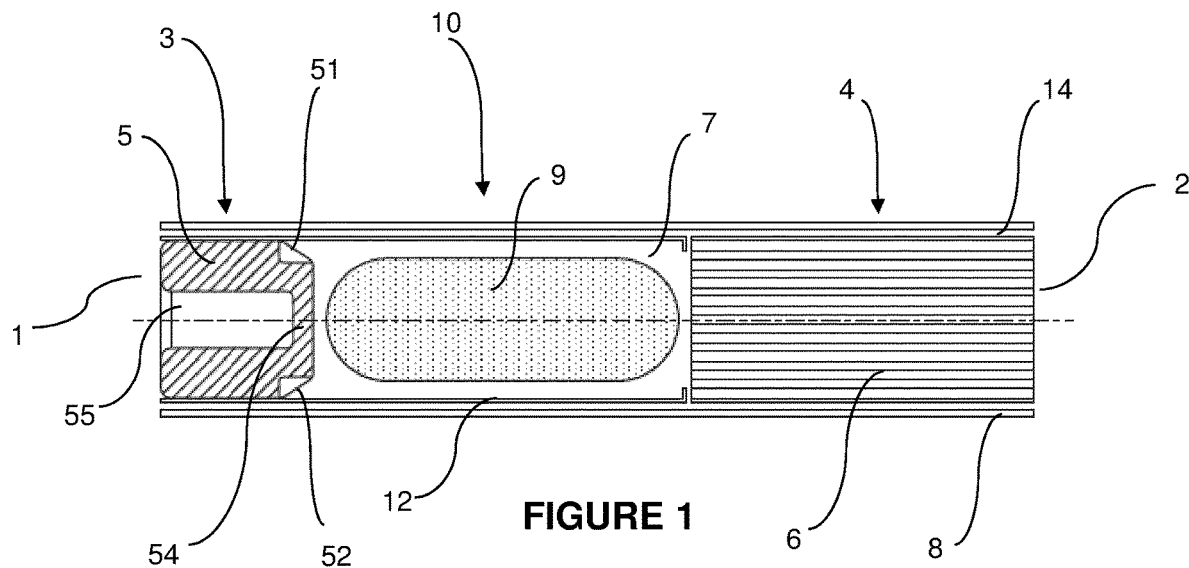
FIG. 1 is a cross-sectional diagram of an inhaler article of the present disclosure.
Figure 2:
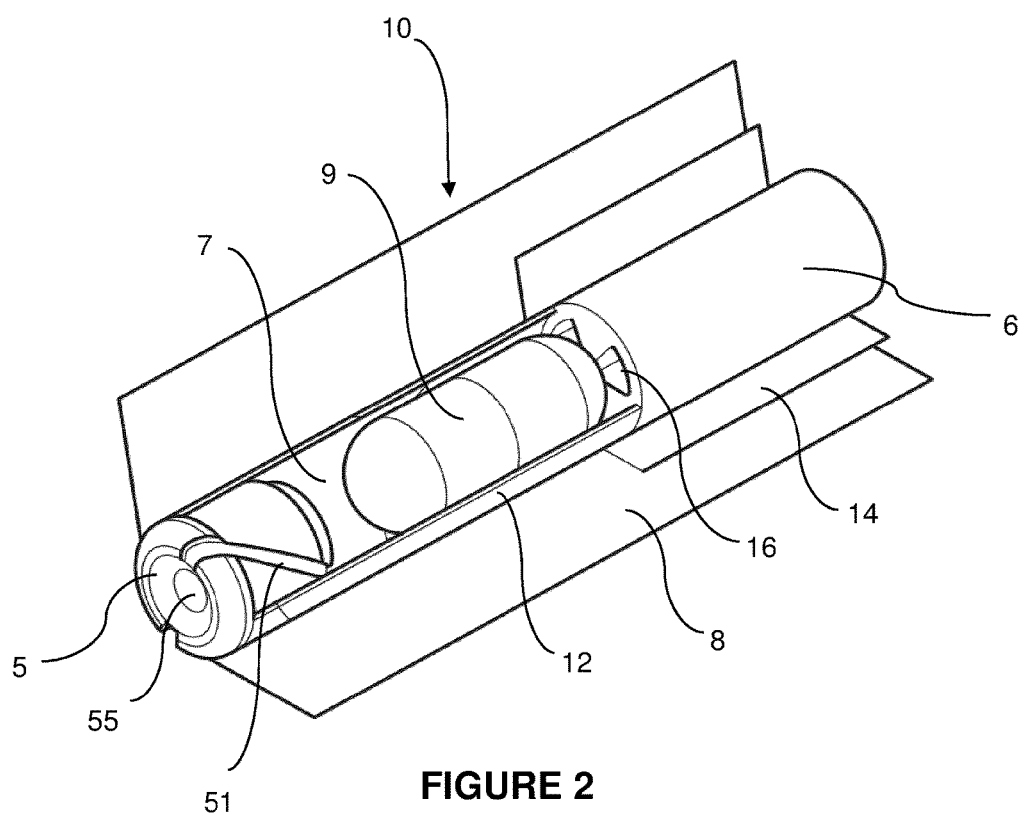
FIG. 2 is a cutaway perspective view of an inhaler article of the present disclosure.

FIGS. 1 and 2 illustrate an inhaler article 10 in accordance with the present disclosure. The inhaler article 10 extends between its upstream end 1 and its downstream (or mouth) end 2. The inhaler article 10 comprises an upstream section 3 and a downstream section 4 located downstream of the upstream section 3 and spaced apart from the upstream section 3. A cavity 7 configured to receive a capsule 9 containing inhalable material is between the upstream and downstream sections 3, 4 of the inhaler article 10. The inhalable material comprises nicotine.

As shown in FIGS. 1 and 2, the upstream section 3 comprises an end plug 5 and the downstream section 4 comprises a filter segment 6. The end plug 5 extends from the upstream end 1 of the inhaler article 10 to the cavity 7, or the upstream portion thereof. The filter segment 6 extends from the cavity 7, or the downstream portion thereof, to the downstream end 2 of the inhaler article 10.

The inhaler article 10 further comprises a hollow tubular element 12, a filter wrapper 14 surrounding the filter segment 6 and an overall wrapper 8 wrapping both the hollow tubular element 12 and the filter segment 6. The hollow tubular element 12 contains both the end plug 5 and the cavity 7. The hollow tubular element 12, the downstream end of the end plug 5 of the upstream section 3 and the upstream end of the filter segment 6 define the cavity 7. The end plug 5 is retained with the hollow tubular element 12 due to a tight fit or friction fit established between the end plug 5 and the hollow tubular element 12. The downstream end of the hollow tubular element 12 abuts the upstream end of the filter segment 6 of the downstream section 4. The filter segment 6 and the filter wrapper 14 together form the downstream section 4. The overall wrapper 8 circumscribes both the hollow tubular element 12 and the downstream section 4. The wrapper 8 secures the downstream section 4 in axial alignment with the hollow tubular element 12.

In the embodiment shown in FIGS. 1 and 2, the overall length of the inhaler article 10 is about 45 mm. The length of the end plug 5 is about 8 mm, the length of the cavity 7 is about 20 mm and the length of the filter segment 6 is about 17 mm. The length of the hollow tubular element 12 surrounding both the end plug 5 and the cavity 7 is between about 25 mm and about 28 mm. The inner diameter of the hollow tubular element 12 is about 6.6 mm and the outer diameter of the hollow tubular element 12 is about 7.1 mm. The length of the wrapping material 8 is about 45 mm. The length of the filter wrapper 14 is about 17 mm. The diameter of the inhaler article 10 is about 7 mm. The relative RTD, or RTD per unit length, of the filter segment 6 is about 0.02 mm of water per mm. The RTD of the filter segment 6 is about 0.34 mm of water. A diameter of the capsule 9 is about 6 mm and the length of the capsule 9 is about 16 mm.

The end plug 5 defines a central channel or passage 55 extending through the centre of the end plug 5 body from the upstream end of the end plug 5. The central channel 55 of the end plug 5 is open at the upstream end and closed by a resealable member 54 at its downstream end. The downstream end of the central channel 55 and the resealable member 54 are adjacent to the cavity 7. The central channel 55 of the end plug 5 is arranged to provide access to the cavity 7 to a piercing element, shown in FIG. 3. Such a piercing element is configured to pierce the membrane 54 and extend into the cavity 7 and pierce or puncture the capsule 9 in order to activate it for consumption. The length of the central channel 55 is the same as the length of the end plug 5. A diameter of the central channel 55 is less than about 6 mm. The central channel is structured to accommodate a piercing element or needle from 27 gauge (outer diameter=0.42 mm) to 4 gauge (outer diameter=5 mm).

The end plug 5 comprises at least one air flow inlet channel 51, 52 extending from the upstream end of the end plug 5 to the cavity 7 such that the fluid communication between the cavity 7 and the exterior of the inhaler article 10 can be established. As shown in FIG. 2, the at least one air flow channel comprises two air inlet channels 51, 52 extending in a spiral or helical path along and partially around the outer surface of the end plug 5. The inlet channels 51, 52 extend both in the longitudinal and circumferential directions defined by the end plug 5. In the other words, the inlet channels 51, 52 each extend in a direction that diverges from a direction that is parallel to the longitudinal axis of the inhaler article 10 and end plug 5. Thus, the inlet channels 51, 52 are non-parallel with the longitudinal axis of the inhaler article 10. The inlet channels 51, 52 follow a helical path around the end plug 7. As a result, the inlet channels 51, 52 are configured to generate a swirling air flow within the cavity 7. The swirling air flow is arranged to agitate and rotate the capsule 9 within the cavity 7 so that inhalable material, once the capsule 9 has been pierced, is released downstream towards the mouth or downstream end 2 of the inhaler article 10.

Figure 3:
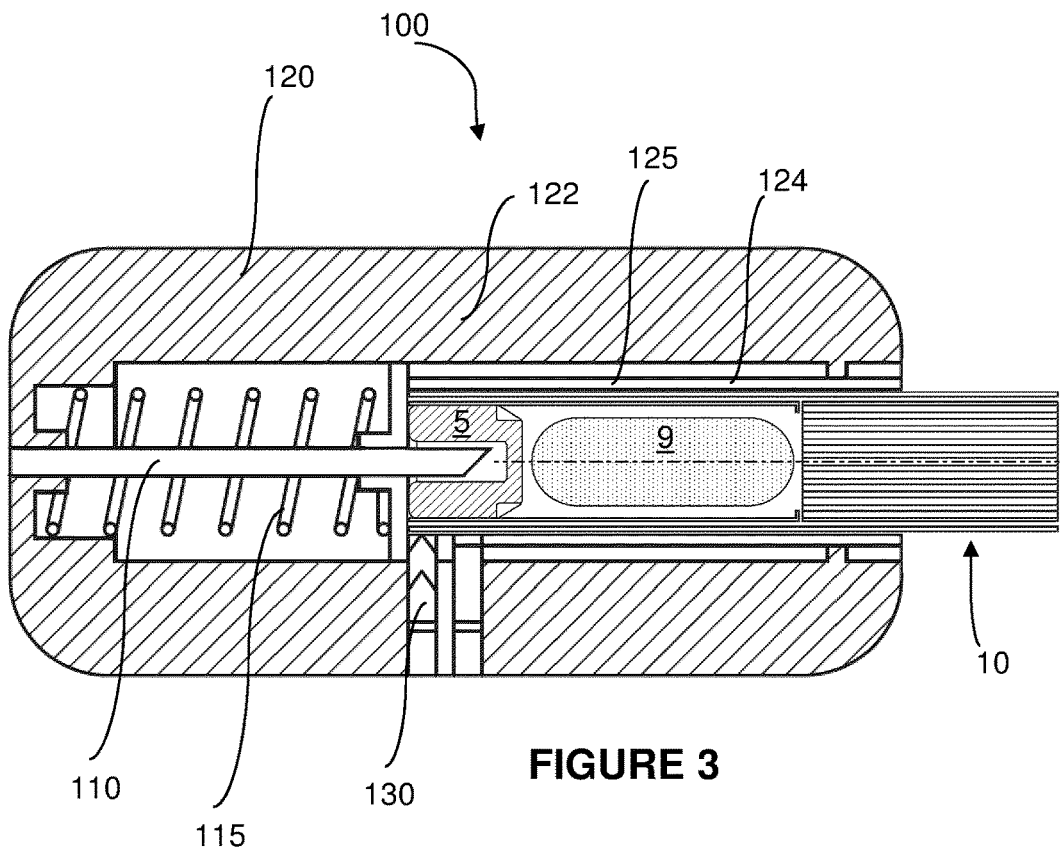
FIG. 3 is cross-sectional diagram of an inhaler system in accordance with the present disclosure.
Figure 4:
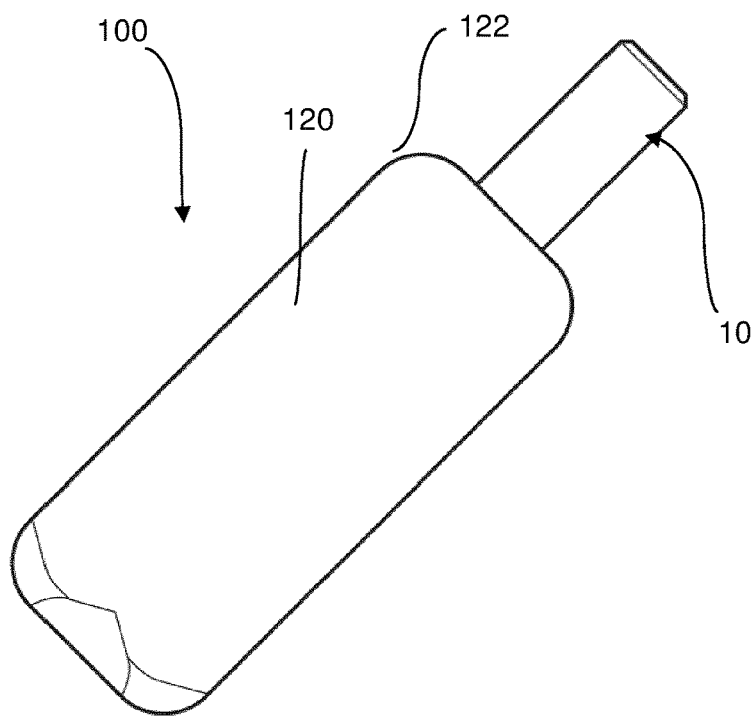
FIG. 4 is a plan view of the inhaler system.

FIGS. 3 and 4 display an inhaler system 100 comprising the inhaler article 10 and a holder or device 120 for receiving the inhaler article 10. The holder 120 comprises a housing 122 defining a housing cavity configured to receive the inhaler article 10. The housing cavity 125 is arranged to receive the upstream end 1 of the inhaler article 10.

The holder 120 also comprises a piercing element 110 configured to extend into the housing cavity 125 and pierce the capsule 9 of the inhaler article 10. During use, the piercing element 110 is arranged to be aligned with the longitudinal axis of the inhaler article 10 and the centre of the central channel 55 of the end plug 5. When the inhaler article 10 is pushed by a consumer further into the housing cavity 125, the piercing element 110 can extend into the cavity 7 of the inhaler article 10 by passing through the central channel 55 and the resealable member 54 of the end plug 5 as shown in FIG. 3. Once the capsule 9 is activated (or pierced), a consumer can draw on the mouth end, or downstream end 2, of the inhaler article 10, either when it is received in the holder 100 or when the inhaler article 10 has been extracted from the holder 100 after capsule activation and a user obstructs the pierced central channel 55 so that air enters by the air inlet channels 51, 52.

The holder 120 also includes a marking element 130. The marking element 130 is arranged to mark or provide an indication on the outer wrapper 8 of the inhaler article 10 that the inhaler article 10 has been consumed. The marking element 130 may be actuated upon the piercing element 110 being actuated.

The holder 120 also includes a sleeve 124 configured to retain the inhaler article 110 within the housing cavity 125. The sleeve 124 comprises a sleeve cavity and is movable within the housing cavity 125 along the longitudinal axis of the housing 122 of the holder 100. The sleeve 124 comprises a first open end and a second opposing end. The first open end is configured to receive the upstream end 1 of the inhaler article 10. The second opposing end of the sleeve 124 is configured to abut the upstream end 1 of the inhaler article 10. The piercing element 110 is arranged to extend through the second opposing end of the sleeve 124 in order to extend into the inhaler article 10 and eventually pierce the capsule 9.

The piercing element 110 is fixed to the interior of the holder housing 122 and is configured to extend into the housing cavity 125 and sleeve cavity along a longitudinal axis of the holder 120.

The holder 120 comprises a spring element 115 arranged to bias the sleeve 124 and the inhaler article 10 positioned within the sleeve cavity away from the piercing element 110 and towards the entry of the housing cavity 125. In order to activate the capsule, a consumer can push the inhaler article 10 and, as a result, the sleeve 124 further into the housing cavity so that the piercing element 110 is inserted deeper into the inhaler article 10 and eventually activates the capsule 9 of the inhaler article 10. Upon suitable activation or piercing of the capsule 9, the consumer can cease from pushing the inhaler article 10 and the spring element 115 will push or bias the sleeve 124 and the inhaler article 10 away from a distal end of the housing cavity 125 and towards the entry of the housing cavity 125. A consumer will be able to gather from audible or tactile feedback that the capsule 9 has been successfully pierced by the piercing element 110.

Figure 5:
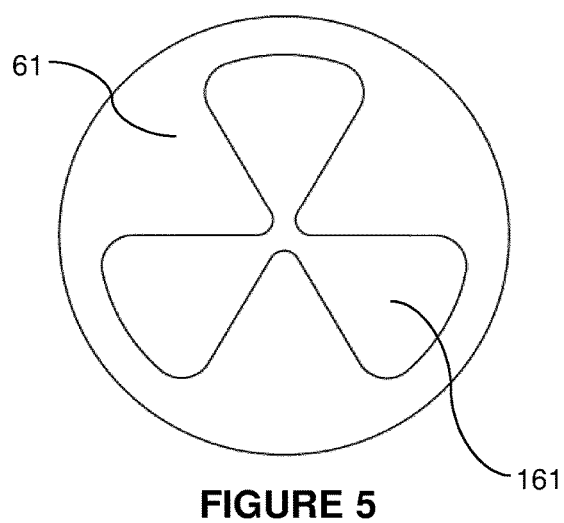

The filter segment 6 of the inhaler article 10 comprises at least one filter air flow channel 16 extending along the filter segment 6. FIG. 5 shows an embodiment of a filter segment 61 comprising a single Y-shaped air flow channel 161. The Y-shaped channel 161 can be considered to consist of three channels joined together along the central axis of the filter segment 61 by a central channel to form a single Y-shaped air flow channel 161. The cross-sectional area of the air flow channel 161 is at least 25% of the total cross-sectional area of the filter segment 61. The filter segment 61 is formed from cellulose acetate tow or other suitable materials. The RTD per unit length of the filter segment 61 is about 0.02 mm of water per mm.

Figure 6:
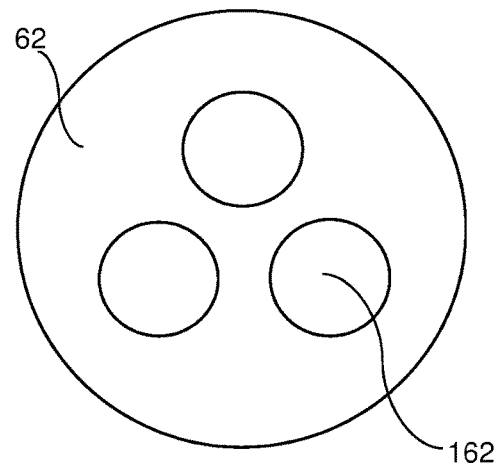

FIG. 6 shows an embodiment of a filter segment 62 comprising three air flow channels 162. As shown in FIG. 6, the air flow channels 162 are circular and are arranged in a triangular formation. The total cross-sectional area of the air flow channels 162 is at least 10% of the total cross-sectional area of the filter segment 62. The filter segment 62 is formed from cellulose acetate tow or other suitable materials.

Figure 7:
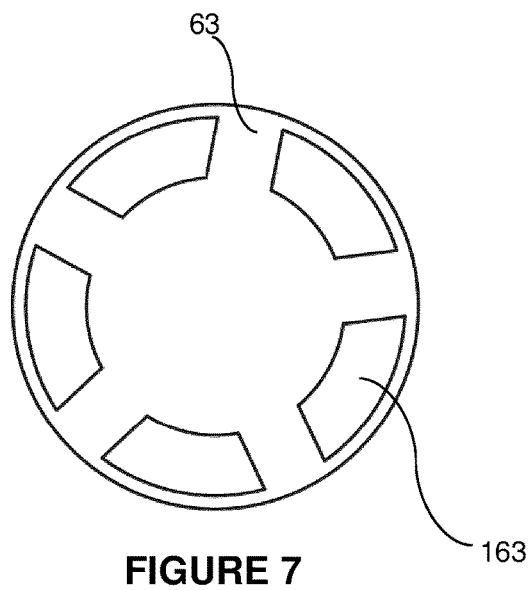

FIG. 7 shows an embodiment of a filter segment 63 comprising five air flow channels 163. As shown in FIG. 7, the air flow channels 163 are in the shape of annular sectors and are evenly circumferentially distributed in the vicinity of the outer periphery of the filter segment 63.

The total cross-sectional area of the air flow channels 163 is at least 10% of the total cross-sectional area of the filter segment 63. The filter segment 63 is formed from cellulose acetate tow or other suitable materials. The RTD per unit length of the filter segment 63 is about 0.05 mm of water per mm.

Figure 8:
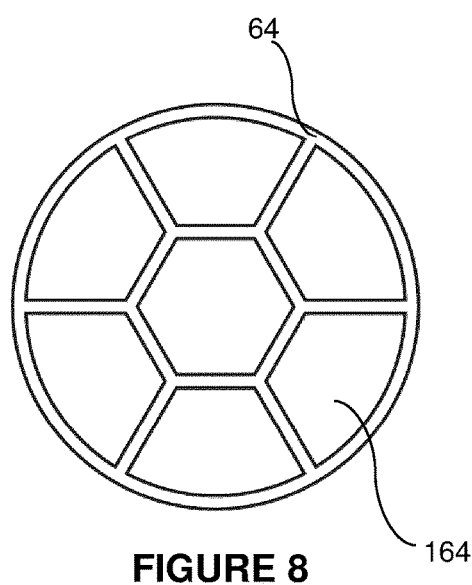

FIG. 8 shows an embodiment of a filter segment 64 comprising seven air flow channels 164. The total cross-sectional area of the air flow channels 164 is at least 75% of the total cross-sectional area of the filter segment 64. The filter segment 64 is formed from a bioplastic material. The RTD per unit length of the filter segment 64 is about 0.01 mm of water per mm.

Figure 9:
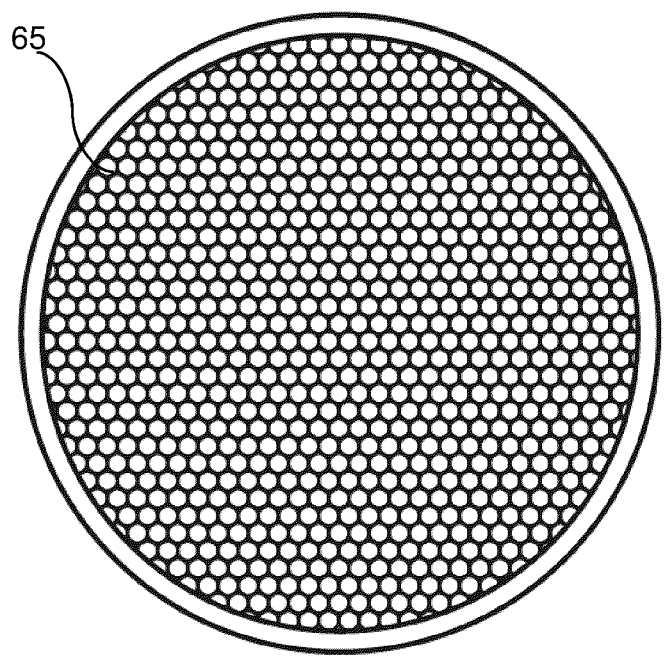

FIG. 9 shows an embodiment of a filter segment 65 formed from a bundle of fibres of polylactic acid extending longitudinally along the filter segment 65. The gaps (not shown) amongst the fibres effectively provide air flow channels. The cross-sectional area of the filter segment 65 occupied by the fibres is at least about 95% of the total cross-sectional area of the filter segment 65. The RTD per unit length of the filter segment 65 is about 0.6 mm of water per mm.

Figure 10:
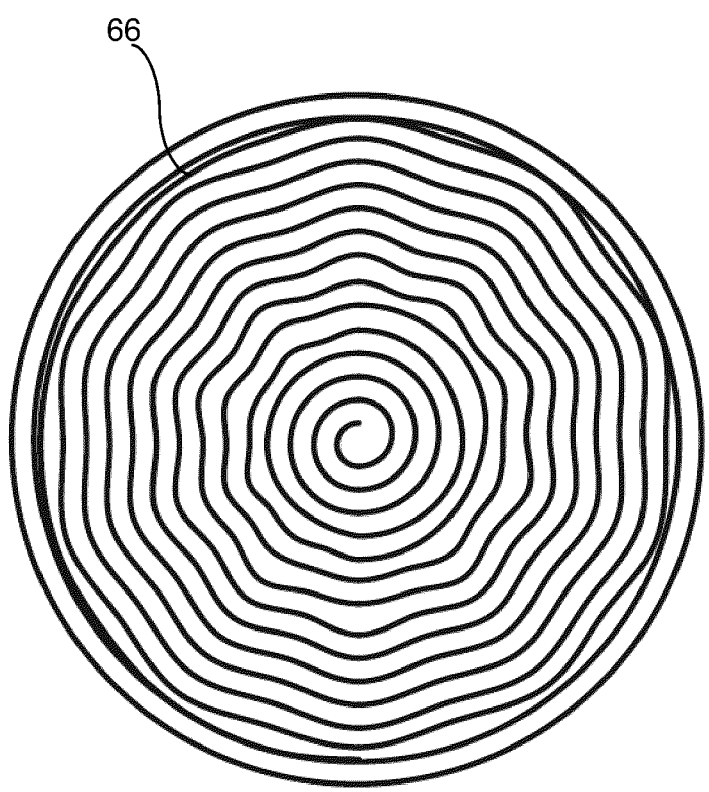

FIG. 10 shows an embodiment of a filter segment 65 comprising a roll of crimped sheet of a paper-based material. Longitudinally-extending gaps within the rolled, crimped sheet material are defined throughout the length of the filter segment 65. The RTD per unit length of the filter segment 65 is about 0.25 mm of water per mm.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±10% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An inhaler article having an upstream end and a downstream end, the inhaler article comprising:
   an upstream section, the upstream section comprising an end plug;
   a downstream section located downstream of the upstream section and spaced apart from the upstream section, the downstream section comprising a filter segment, wherein the resistance to draw per unit length of the filter segment is greater than 0 millimetres of water per millimetre and less than 3 millimetres of water per millimetre and wherein the filter segment is configured to sustain a force of up to 15 Newtons being applied to its upstream end without deforming substantially;
   a cavity defined between the upstream section and the downstream section, wherein the cavity is configured to be in fluid communication with the exterior of the inhaler article; and
   a capsule containing an inhalable material, wherein the capsule is located in the cavity.

2. An inhaler article according to claim 1, wherein the resistance to draw per unit length of the filter segment is greater than 0 millimetres of water per millimetre and less than 1 millimetre of water per millimetre.

3. An inhaler article according to claim 1, wherein the Young's modulus of the material of the filter segment is greater than 10 MPa.

4. An inhaler article according to claim 1, wherein the resistance to draw of the filter segment is greater than 0 millimetres of water and less than 10 millimetres of water.

5. An inhaler article according to claim 1, wherein the length of the filter segment is between 10 millimetres and 20 millimetres.

6. An inhaler article according to claim 1, wherein the filter segment extends from the cavity to the downstream end of the inhaler article.

7. An inhaler article according to claim 1, further comprising a hollow tubular element extending from the upstream end of the inhaler article to the filter segment, wherein the end plug and the capsule are located within the hollow tubular element.

8. An inhaler article according to claim 7, wherein the inhaler article comprises a wrapping material circumscribing the hollow tubular element and the downstream section, wherein the wrapping material secures the downstream section in axial alignment with the hollow tubular element.

9. An inhaler article according to claim 1, wherein the end plug defines at least one air flow inlet channel extending from the upstream end of the end plug to the cavity such that the fluid communication between the cavity and the exterior of the inhaler article is established.

10. An inhaler article according to claim 9, wherein the at least one air flow inlet channel comprises two air flow inlet channels configured to generate a swirling air flow within the cavity.

11. An inhaler article according to claim 1, wherein the filter segment comprises at least one filter air flow channel extending along the filter segment.

12. An inhaler article according to claim 1, wherein the inhalable material comprises nicotine.

13. An inhaler article according to claim 1, wherein the end plug comprises a central channel extending through the body of the end plug, the central channel being configured to provide access to the cavity to a piercing element.

14. An inhaler system comprising an inhaler article according to claim 1 and a holder for receiving the inhaler article, the holder comprising:
   a housing defining a housing cavity configured to receive the inhaler article; and
   a piercing element configured to extend into the housing cavity and pierce the capsule of the inhaler article.

* * * * *